United States Patent
Athalye

(10) Patent No.: US 7,669,900 B2
(45) Date of Patent: Mar. 2, 2010

(54) INTERFACE O-RING SEAL FOR LOW PERMEATION FLANGE OF A FUEL SUPPLY UNIT

(75) Inventor: Parag Athalye, Auburn Hills, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 281 days.

(21) Appl. No.: 11/822,649

(22) Filed: Jul. 9, 2007

(65) Prior Publication Data
US 2008/0012240 A1 Jan. 17, 2008

Related U.S. Application Data

(60) Provisional application No. 60/830,817, filed on Jul. 14, 2006.

(51) Int. Cl.
*F16L 13/14* (2006.01)
*F16L 47/28* (2006.01)

(52) U.S. Cl. ............ 285/204; 285/201; 285/285.1; 285/293.1

(58) Field of Classification Search ........ 285/139.2, 285/141.1, 179, 189, 201, 204, 285.1, 293.1, 285/423
See application file for complete search history.

(56) References Cited

U.S. PATENT DOCUMENTS

| | | | | |
|---|---|---|---|---|
| 3,472,534 A * | 10/1969 | Stevens | ........... | 285/119 |
| 5,975,586 A * | 11/1999 | Pradel | ........... | 285/12 |
| 6,053,537 A * | 4/2000 | Guest | ........... | 285/148.19 |
| 6,305,408 B1 * | 10/2001 | Goto et al. | ........... | 137/351 |
| 6,408,867 B2 * | 6/2002 | Aoki et al. | ........... | 137/202 |
| 6,484,741 B2 * | 11/2002 | Benjey et al. | ........... | 137/15.26 |
| 6,488,877 B1 * | 12/2002 | Amburgey et al. | ........... | 264/219 |
| 6,517,117 B1 * | 2/2003 | Lai | ........... | 285/202 |
| 6,540,868 B1 * | 4/2003 | Kertesz | ........... | 156/304.2 |
| 6,552,294 B1 * | 4/2003 | Ananthanarayanan et al. | ........... | 219/107 |
| 6,722,708 B2 * | 4/2004 | Morohoshi et al. | ........... | 285/423 |
| 6,755,206 B2 * | 6/2004 | Nishi et al. | ........... | 137/202 |
| 6,834,771 B2 * | 12/2004 | Suzuki et al. | ........... | 220/361 |
| 7,066,498 B2 * | 6/2006 | Kertesz | ........... | 285/288.1 |
| 7,128,346 B2 * | 10/2006 | Miyajima et al. | ........... | 285/204 |
| 7,210,709 B2 * | 5/2007 | Kertesz | ........... | 285/288.1 |
| 2001/0029994 A1 | 10/2001 | Brown et al. | | |
| 2003/0173776 A1 | 9/2003 | Morohoshi et al. | | |
| 2004/0051304 A1 * | 3/2004 | Kertesz | ........... | 285/21.1 |
| 2004/0079752 A1 | 4/2004 | Suzuki et al. | | |
| 2004/0239112 A1 * | 12/2004 | Kertesz | ........... | 285/288.1 |
| 2008/0011277 A1 | 1/2008 | Athalye | | |
| 2008/0042435 A1 | 2/2008 | Athalye | | |
| 2008/0042436 A1 | 2/2008 | Athalye | | |
| 2008/0042437 A1 | 2/2008 | Athalye | | |
| 2008/0042439 A1 | 2/2008 | Athalye | | |

FOREIGN PATENT DOCUMENTS

CA 2268598 A1 10/1999
EP 1211196 A1 6/2002

* cited by examiner

*Primary Examiner*—James M Hewitt

(57) ABSTRACT

A flange structure (10') for a fuel supply unit of a vehicle includes at least one electrically conductive fuel port (16') having first and second ends (22, 24) and features (25, 26) defining a channel (28) about a periphery thereof. An elastomer seal (30) is disposed in the channel. A plastic flange (20') is overmolded on at least a portion of the fuel port between the first and second ends and on at least a portion of the elastomer seal, with the elastomer seal defining a barrier preventing fuel or fuel vapor from passing between the periphery of the fuel port and the overmolded flange.

4 Claims, 2 Drawing Sheets

INTERFACE O-RING SEAL FOR LOW PERMEATION FLANGE OF A FUEL SUPPLY UNIT

This application claims the benefit of the earlier filing date of U.S. Provisional Application No. 60/830,817, filed on Jul. 14, 2006, and claims the benefit thereof for priority purposes.

FIELD OF THE INVENTION

The invention relates to fuel supply units for automobile vehicles and, more particularly, to providing a permeation barrier between a conductive fuel port and a non-conductive flange.

BACKGROUND OF THE INVENTION

With reference to FIG. 1, a typical fuel supply unit for a vehicle includes flange structure, generally indicated at 10 including a steel or plastic flange 20 configured to be sealed to a wall of a fuel tank. The flange structure 10 is interconnected with a fuel pump assembly 12 by a pair of metal struts 14. The flange structure 10 also includes various ports 16 that provide pathways into and out of the tank for fuel. The ports 16 are connected with the fuel pump 12 to supply fuel to an engine, but the connecting tubes are not shown in FIG. 1.

Recently, there has been a greater focus on Electro Static Dissipation (ESD) in such fuel supply systems. It is known that as fuel flows through various components of the fuel supply system, such as the fuel pump assembly, the fuel filter, and various valving and tubing, there is the potential for static electricity to be generated in the various conductive components of the fuel supply system. To dissipate this static electricity, fuel supply systems electrically ground the components through electrical interconnection.

For example, as shown in FIG. 1, some systems employ a separate cable harness 18 which grounds through the pump negative. Other systems employ grounding clips (not shown) that touch an inline filter. In addition, conductive portions of fuel ports have been grounded.

There is a need provide for ESD of fuel ports while creating a barrier to prevent permeation or leakage of fuel around the fuel port.

SUMMARY OF THE INVENTION

An object of the invention is to fulfill the need referred to above. In accordance with the principles of the present invention, this objective is obtained by providing a flange structure for a fuel supply unit of a vehicle. The flange structure includes at least one electrically conductive fuel port having first and second ends and features defining a channel about a periphery thereof. An elastomer seal is disposed in the channel. A plastic flange is overmolded on at least a portion of the fuel port between the first and second ends and on at least a portion of the elastomer seal, with the elastomer seal defining a barrier preventing fuel or fuel vapor from passing between the periphery of the fuel port and the overmolded flange.

In accordance with another aspect of the disclosed embodiment, a method of providing a flange structure for a fuel supply unit of a vehicle provides at least one electrically conductive fuel port having first and second ends and features defining channel about a periphery thereof. An elastomer seal is placed in the channel. The method overmolds a plastic flange on at least a portion of the fuel port between the first and second ends and on at least a portion of the elastomer seal, with the elastomer seal defining a barrier preventing fuel or fuel vapor from passing between the periphery of the fuel port and the overmolded flange.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
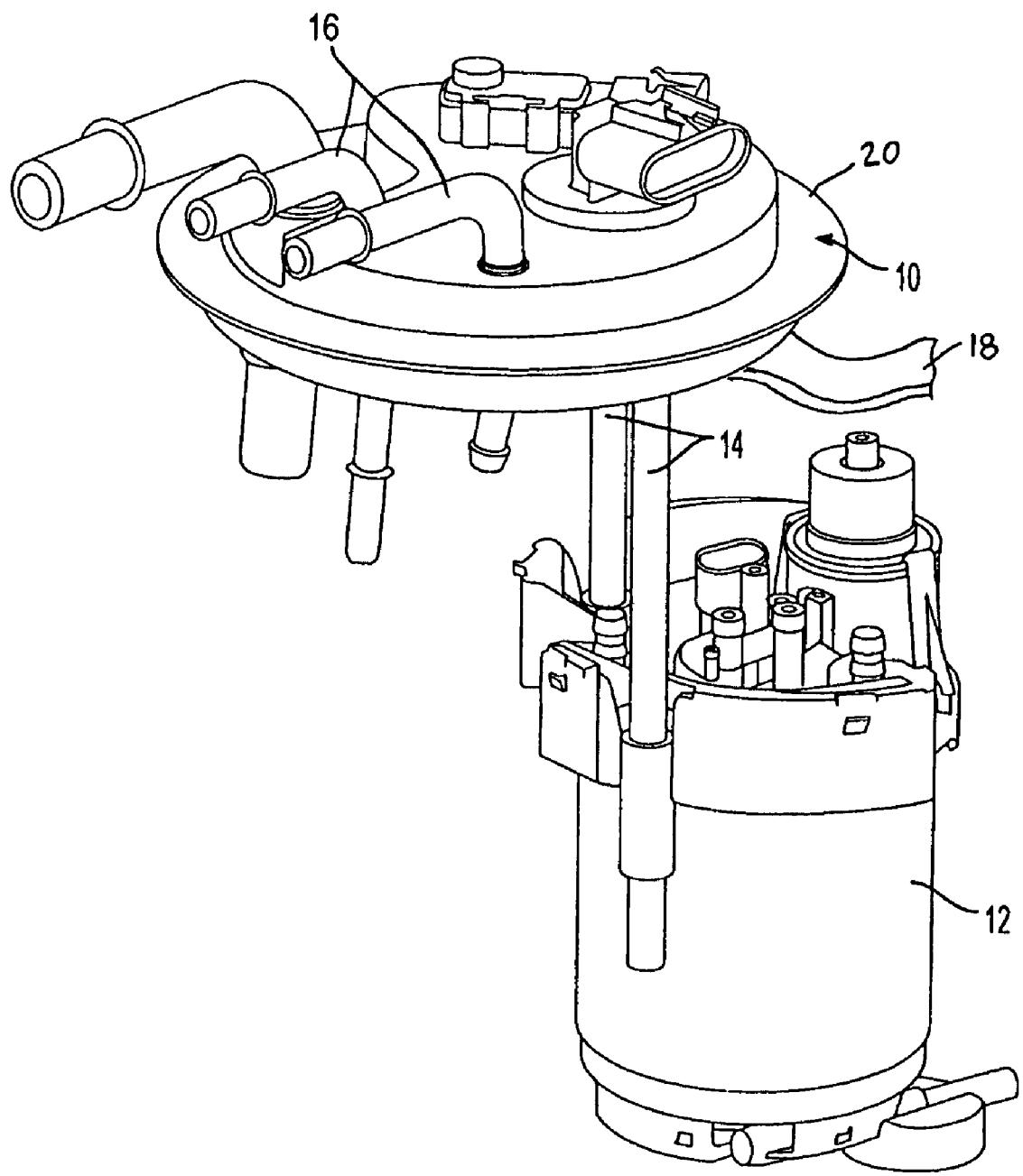
FIG. 1 is a view of conventional fuel supply unit of a vehicle.
Figure 2:
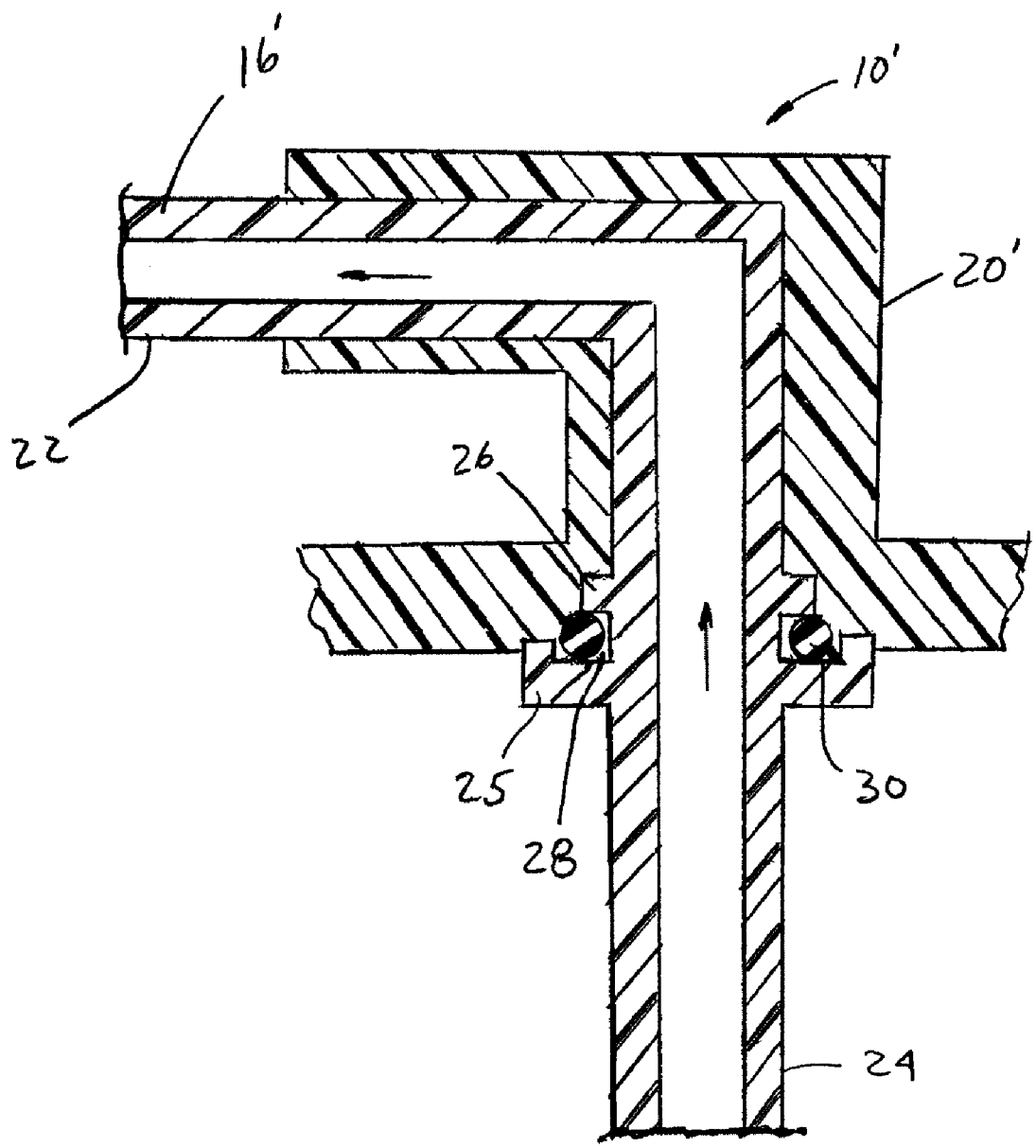
FIG. 2 is a sectional view of a flange structure including a flange and a fuel port of provided in accordance with an embodiment of the invention.

With reference to FIG. 2, a portion of a flange structure is shown, generally indicated at 10', in accordance with the principles of an embodiment of the invention. The flange structure 10' can be similar to the flange structure 10 shown in FIG. 1, employed in a fuel supply unit of a vehicle. The flange structure 10 includes a fuel port 16' and a flange 20' overmolded on at least a portion of the fuel port 16'.

The fuel port 16' is electrically conductive, preferably of insert molded plastic having a first end 22 and a second end 24. As noted above, a portion of the periphery of the fuel port 16', between the first and second ends, is overmolded with a non-conductive plastic flange 20'. The flange 20' is constructed and arranged to be sealed to a wall of a fuel tank (not shown). Thus, the first end 22 is accessible at an outside portion of the flange 20' and is constructed and arranged to be connected at the engine side of a vehicle and grounded. The second end 24 of the fuel port 16' is associated with the inside portion of the flange 20' and thus is to be exposed to fuel in a fuel tank (not shown). The second end 24 of the fuel port 16' is constructed and arranged to be coupled with a fuel pump (not shown in FIG. 2) preferably of the type shown in FIG. 1. Alternatively, the second end 24 can be grounded at the fuel pump. In the embodiment fuel moves in the direction of the arrows in FIG. 2, from the pump to the engine of a vehicle.

The fuel port 16' includes supporting features 25 and 26 defining an annular channel 28 about the periphery thereof. In the embodiment, the feature 25 is generally L-shaped in section and extends annularly about the periphery of the fuel port 16'. The feature 26 is an annular rim spaced above the feature 25 and disposed about the periphery of the fuel port 16'. The features 25 and 26 defined the channel 28 for supporting an elastomer seal such as an O-ring 30 and also ensure that the O-ring 30 is located properly in the channel 28. The feature 26 is spaced above feature 25 a distance generally equal to or slightly greater than the diameter of the O-ring 30 and acts to capture the O-ring during an overmolding process as described below.

Since the end 24 of the fuel port 16' is exposed to fuel, there is a chance of leakage or permeation of fuel or vapors between the periphery of the fuel port 16' and the overmolded flange 20'. Thus, in accordance with the embodiment, prior to overmolding the flange 20', the O-ring 30 is placed in the channel 28. Thereafter, the flange 20' is overmolded such that at least a portion of the O-ring 30 is also overmolded with the plastic material of the flange 20'. This ensures that the O-ring 30 is captured to seal the interface between the conductive fuel port 16' and the non-conductive flange 20'. Thus, the O-ring 30 acts as a leakage or permeation barrier and is of high-temperature resistant material so as to be overmolded. Although only one fuel port 16' is shown, it can be appreciated that other similar ports, with associated O-rings 30, can be provided in the flange structure 10'.

Hence, by employing a conductive fuel port 16', ESD can be achieved and by overmolding an O-ring 30 with the plastic flange 20', a fuel leakage barrier is provided.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A flange structure for a fuel supply unit of a vehicle, the flange structure comprising:
   at least one electrically conductive fuel port having first and second ends and integral features defining a channel about a periphery thereof,
   an elastomer O-ring seal in the channel, and
   a plastic flange overmolded on at least a portion of the fuel port between the first and second ends and overmolded on at least a portion of the elastomer O-ring seal, with the elastomer O-ring seal defining a barrier preventing fuel or fuel vapor from passing between the periphery of the fuel port and the overmolded flange,
   wherein the features include a first feature, generally L-shaped in section, that extends annularly about the periphery of the fuel port and a second feature defining an annular rim spaced from the first feature, and
   wherein the second feature is spaced from the first feature a distance generally equal to a diameter of the O-ring so as to capture the O-ring.

2. The flange structure of claim 1, wherein the fuel port is composed of electrically conductive plastic.

3. A method of providing a flange structure for a fuel supply unit of a vehicle, the method including:
   providing at least one electrically conductive fuel port having first and second ends and integral features defining a channel about a periphery thereof,
   placing an elastomer O-ring seal in the channel, and
   overmolding a plastic flange on at least a portion of the fuel port between the first and second ends and on at least a portion of the elastomer O-ring seal, with the elastomer O-ring seal defining a barrier preventing fuel or fuel vapor from passing between the periphery of the fuel port and the overmolded flange,
   wherein the integral features include a first feature, generally L-share in section, that extends annularly about the periphery of the fuel port and a second feature defining an annular rim spaced from the first feature so as to generally capture the elastomer O-ring seal prior to the overmolding step.

4. The method of claim 3, wherein the providing step includes insert molding the fuel port from electrically conductive plastic.

* * * * *